Aug. 25, 1942.    A. LUKKEN    2,293,910
BRUSH FORK
Filed July 11, 1941

Inventor
*August Lukken*

By *Clarence A O'Brien*

*Attorney*

Patented Aug. 25, 1942

2,293,910

UNITED STATES PATENT OFFICE 2,293,910

BRUSH FORK

August Lukken, Deadwood, S. Dak.

Application July 11, 1941, Serial No. 402,020

1 Claim. (Cl. 294—52)

This invention relates to new and useful improvements in brush handling forks such as are frequently required by foresters and members of civilian conservation camps.

The principal object of the present invention is to provide a fork which is provided with means to assist either in the pushing or pulling of brush in addition to the usual act of lifting brush.

Other objects and advantages of the invention will become apparent to the reader of the following description.

In the drawing—

Figure 1:
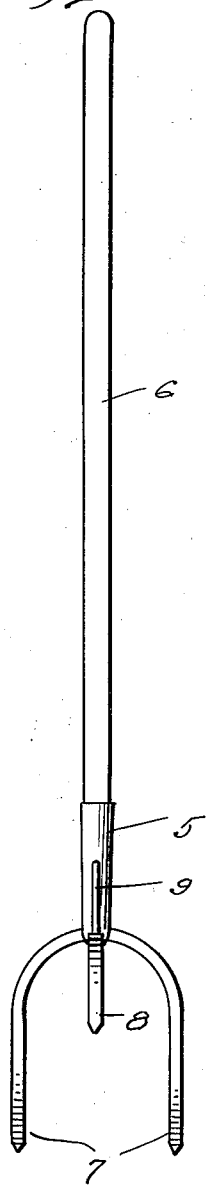
Figure 1 represents a front elevational view of the implement.
Figure 2:
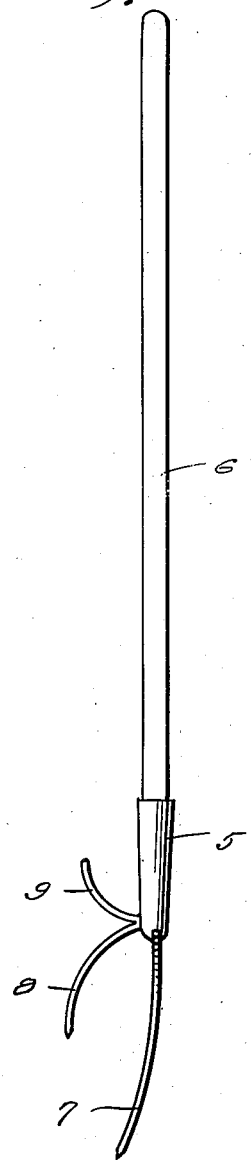
Figure 2 is a side elevational view.

Referring to the drawing wherein like numerals designate like parts, it can be seen that numeral 5 denotes a tapered socket into which one end of an elongated handle 6 is wedged and perhaps otherwise secured.

Extending forwardly from this socket structure 5 are arcuate-shaped tines 7, 7. These tines 7, 7 extend from the forward end of the socket structure 5, while extending from a side portion of the socket structure 5 is a forwardly curved pusher tine 8 which terminates short of the tines 7, 7 and in spaced relation above the same.

Numeral 9 denotes a puller tine which curves rearwardly from the socket structure 5 at the point to which the tine 8 connects.

It can now be seen that the tines 7, 7 are primarily used for lifting brush and other materials and the tines 7 prevent the brush from riding the handle 6. Further, the tine 8 can be used when brush is to be pushed about and when it is desired to pull brush toward oneself, the tine 9 can be brought into use.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A brush handling implement comprising a handle, a ferrule-like socket on the front end of the handle, a fork extending forwardly from the front end of the socket, and a pair of front and rear pusher and puller tines, respectively, on the front end of said socket arranged in a common plane coinciding with the longitudinal center of the fork, the pusher tine curving upwardly and forwardly over said fork, and the puller tine curving upwardly and rearwardly over said socket, the pusher tine being longer than the puller tine.

AUGUST LUKKEN.